Feb. 7, 1933.   I. H. KENDALL   1,896,519
SANITARY PIPE COUPLING
Filed Aug. 25, 1928

INVENTOR
Ira H. Kendall
BY
Mock & Blum
ATTORNEYS

Patented Feb. 7, 1933

1,896,519

UNITED STATES PATENT OFFICE

IRA H. KENDALL, OF POTSDAM, NEW YORK, ASSIGNOR TO GENEVIEVE A. KENDALL, OF POTSDAM, NEW YORK

SANITARY PIPE COUPLING

Application filed August 25, 1928. Serial No. 302,045.

My invention relates to a new and improved sanitary pipe coupling.

One of the objects of my invention is to provide an improved sanitary pipe coupling which is particularly useful in machinery for dairies, creameries, and the like.

Another object of my invention is to provide a coupling having a cap provided with a closure member, the parts of which can be readily separated to facilitate cleaning the device.

Another object of my invention is to provide a sanitary coupling having a head which is protected when it is carelessly handled.

Other objects of my invention will be set forth in the following description and drawing which illustrate a preferred embodiment thereof, it being understood that the above general statement of the objects of my invention is intended merely to generally explain the same and not to limit it in any manner.

Figures 1, 2:
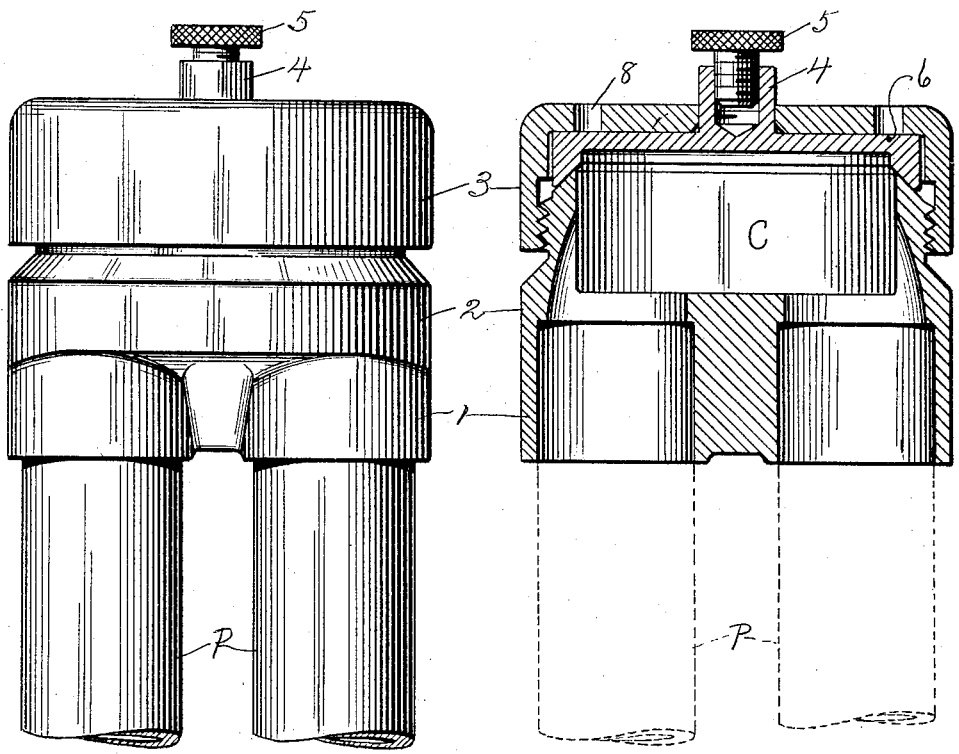
Fig. 1 is an elevation showing the improved coupling.
Fig. 2 is a sectional view on the line 2—2 of Fig. 3.
Figure 3:
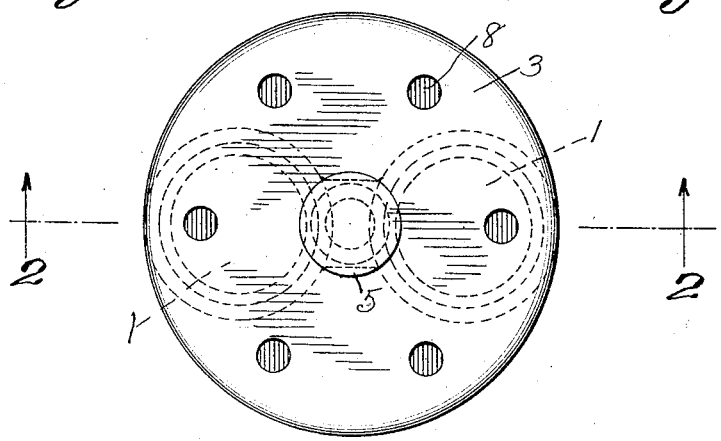
Fig. 3 is a top view.

The coupling comprises a head 2 having a plurality of sockets 1, adapted to receive pipes P. These pipes P can be connected to the sockets 1 in any suitable liquid tight manner, as for example, by means of a tight fit, the use of solder or by any other well known means. As shown in Fig. 2 the head 2 is provided with a chamber C so that the inner ends of the pipes P communicate with each other through this chamber C. The chamber C is open at the outer end thereof at which point it is provided with a ground and bevelled seat. The exterior wall of the chamber C is threaded. The cap 3 is cup-shaped and its flange is threaded so that it can be screwed upon the wall of the chamber C. The cap 3 is provided with an interior closure member 6 which has a bevelled and ground face adapted to form a liquid tight fit with the corresponding ground seat of the wall of the chamber C. Hence, the chamber C can be closed without the use of any packing rings made of rubber, leather or the like, which would impart an objectionable taste to the milk. For convenience, the upper end of the head 2 may be designated as its free end. As shown in Fig. 2, the tapered beveled face of said head tapers outwardly from said free end. The tapered ground face of closure member 6 has the same shape as said beveled face, in order to form a tight-fitting ground joint. The beveled ground face of the closure member 6 comprises the inner rim thereof, so that a sanitary fitting is provided.

Referring to Fig. 2, the beveled rim of the closure member has a vertical cylindrical wall directly adjacent thereto, and this wall has a slight clearance between it and the corresponding adjacent wall of the cap 3, when the closure member is in the operative position shown in Fig. 2. Hence, the cap can turn with respect to the closure member until their end faces engage.

The closure member 6 is provided with an internally threaded boss which projects through a central opening in the outer planar face of the cap 3. This boss is internally threaded and is adapted to receive a screw 5 having a knurled head. While the knurled head of the screw 5 is shown as spaced from the outer end of the boss 4 in the drawing, it is to be understood that the screw 5 can be turned until one face of the head of the screw 5 substantially contacts with the adjacent surface of the threaded boss 4. The cap 3 is also provided with a series of openings 8 which facilitate the manipulation thereof by means of a suitable tool.

The operation of the device is as follows:

The cap 3 and the separate closure member 6 can be assembled by means of the screw 5. When these two parts have been assembled the closure member 6 can move axially with respect to the cap 3 and it can also turn with respect to the cap 3. The axial movement of the closure member 6 is not limited by the screw 5, to an extent sufficient to hinder the operation of the device.

When the cap 3 is screwed into position it forces the closure member 6 into position so that a close and liquid tight contact is secured between the co-operating tapered ground face of the closure member 6 and the tapered wall of the chamber C.

It is obvious that the closure member 6 can be readily separated from the cap 3 in order to clean the parts. Likewise, the cap 3 acts as a guard for the closure member 6 so that if the assembled parts 3, 5 and 6 are dropped by a careless workman, the relatively expensive member 6, whose tapered face must be accurately ground, is protected from injury. Likewise, the screw 5 also protects the various parts from injury if the assembled cap and valve are carelessly handled. The parts of the device can be made of any suitable sanitary metal.

I have shown a preferred embodiment of my invention, but it is clear that numerous changes and omissions could be made without departing from its spirit.

I claim:

1. A pipe fitting comprising a head which is provided at its free end with a ground and beveled face which tapers outwardly from the free end thereof, a cup-shaped cap adapted to be threaded upon the outer periphery of said head, said cap being provided with a central opening, a cup-shaped closure member slidably fitting within said cap and projecting through said opening, said closure member being held in said cap by adjustable retaining means, said closure member having a ground and beveled inner rim which has the same shape as said beveled face, said inner rim being adapted to form a tight-fitting ground joint with said beveled face.

2. A pipe fitting comprising a head which is provided at its free end with a ground and beveled face which tapers outwardly from the free end thereof, a cup-shaped cap adapted to be threaded upon the outer periphery of said head, said cap being provided with a central opening, a cup-shaped closure member having a projection which projects slidably through said opening, said closure member being retained in assembled relation with said cap by means external to said cap, said closure member having a ground and beveled inner rim which has the same shape as said beveled face, said inner rim being adapted to form a tight-fitting ground joint with said beveled face, the adjacent lateral walls of said cap and of said closure members having sufficient clearance to permit said cap to be turned relative to said closure member until the inner end face of said cap abuts the adjacent end face of the closure member.

In testimony whereof I affix my signature.

IRA H. KENDALL.